United States Patent Office 2,739,032
Patented Mar. 20, 1956

2,739,032

IRON-CATALYZED DECOMPOSITION OF SODIUM CHLORITE

William K. Wilson, Takoma Park, Md., assignor to the United States of America as represented by the Secretary of Commerce No Drawing. Application March 30, 1953,
Serial No. 345,744

2 Claims. (Cl. 8—108)

(Granted under Title 35, U. S. Code (1952), sec. 266)

The invention described herein may be manufactured and used by or for the Government of the United States for governmental purposes without the payment to me of any royalty thereon in accordance with the provisions of 35 United States Code, section 266.

The present invention relates to the iron-catalyzed decomposition of sodium chlorite, and more particularly to a method for increasing or decreasing the rate of decomposition of an acid solution of sodium chlorite. This application is a continuation-in-part of application No. 308,952, filed by the present inventor on September 10, 1952, which now stands abandoned.

Acid solutions of sodium chlorite and solutions of chlorine dioxide are used in the bleaching of textiles and paper. It is often desirable in these processes to be able to control the rate of decomposition of the acid chlorite to give chlorine dioxide. At present the rate of decomposition can be increased by increasing the acidity of the solution, increasing the concentration of the sodium chlorite, or by raising the temperature of the solution. Although these means do afford some degree of control over the rate of decomposition, the range of control which these factors provide is necessarily limited, and therefore it is desirable to provide for an even greater range of regulation over the rate of the reaction.

The object of the present invention is to provide a method for increasing or decreasing the rate of decomposition of an acid solution of sodium chlorite.

Another object of the invention is to provide for an increase in the rate of decomposition of sodium chlorite by the addition of a water-soluble ferric or ferrous salt.

Another object of the present invention is to provide a method for nullifying the catalytic effect of ferric or ferrous salts on the decomposition of sodium chlorite by the addition of a water-soluble nonferrous salt of oxalic, tartaric, or citric acids.

Water solutions of sodium chlorite are stable as long as the solutions are neutral or alkaline. However, if the solutions are made acidic by the addition of an acid, such as sulfuric acid, the sodium chlorite decomposes to give sodium chloride, sodium chlorate, and chlorine dioxide. Although the rate of decomposition can be increased by increasing the acid concentration, increasing the concentration of the sodium chlorite, or by raising the temperature of the solution, a means for extending the range of regulation is desirable.

According to the present invention, the rate of decomposition of sodium chlorite can be increased by the addition of small quantities of a water-soluble ferric or ferrous salt. The amount of iron salt added is determined by the concentration of iron ions that is desired. The maximum concentration of iron ions which is effective to increase the rate of decomposition is 0.04 percent by weight based on the weight of the solution. More iron ions could be added but would not appreciably affect the rate of decomposition. Once the rate of decomposition has been increased by the addition of one of these materials, the rate can subsequently be decreased by the addition of a water-soluble nonferrous salt of oxalic, tartaric, or citric acid. Actually the salt of oxalic acid has been found to be the most desirable material to use. The addition of these salts of the organic acids produces a complex ion with the ferric ions, thereby reducing the concentration to a level where no catalytic effect is observed. In order to bind the ferric ions in a complex it is necessary that the ratio of the number of moles of oxalate to the number of moles of iron be not less than 25. The ratios of the number of moles of citrate or tartrate to the number of moles of iron to effectively complex the iron are of the order of 100.

Therefore, for the practical reasons indicated above, one would not use the iron salts of oxalic, tartaric, or citric acids to suppress the decomposition of acid chlorite solutions due to iron impurities. Addition of these salts to accelerate the decomposition of acid chlorite solutions would be effective, but their use would be dictated by economic considerations. One would normally use the cheapest iron salt available.

Obviously, where iron appears as an impurity in the reaction mixture, the rate of decomposition can be decreased by the addition of water-soluble nonferrous salts of the organic acids cited above. This would be of use where the particular bleaching process was dependent on the chlorite rather than the chlorine dioxide concentration.

Example I

For solutions of approximately 0.005 molar in sodium chlorite buffered at pH 3.5 were allowed to stand at 40 degrees C. for 18 hours. To one of the solutions (case 1) nothing was added. To the second solution (case 2) sodium oxalate was added to make the solution 0.0025 M in sodium oxalate. To the third solution (case 3) the same quantity of sodium oxalate plus quantities of ferric chloride equivalent to 0.3 millimoles (0.000175 percent by weight) of iron per liter was added. To the fourth solution (case 4) iron in the same proportion as in case 3 was added but no oxalate was added. The original solutions contained traces of iron as impurities. The following results were obtained:

Case 1: 17 percent decomposition.
Case 2: 12 percent decomposition.
Case 3: 12 percent decomposition.
Case 4: 35 percent decomposition.

Since the reagents contained some iron impurities, it can be seen that the oxalate bound these impurities (case 2) and decreased the rate of decomposition. The oxalate added to solution 3 (case 3) was sufficient to bind the added iron and therefore the rate of decomposition remained the same as in case 2. In case 4 the addition of iron caused a 100 percent increase in the rate of decomposition over that obtained with the original solution.

Example II

Three solutions containing 0.005 molar sodium chlorite buffered at pH 3.52 were allowed to stand at 40 degrees centigrade for 23 hours. In case 1 nothing was added to the solution, which contained no iron impurities. In case 2, 0.1 percent by weight of ferric chloride was added and in case 3, 0.1 percent by weight of ferric ammonium sulfate was added.

| Case No. | 0.1 percent (by wt.) iron salt added | Iron in solution (percent) | Decomposition (percent) |
|---|---|---|---|
| 1 | none | none | 28 |
| 2 | ferric chloride | 0.034 | 68 |
| 3 | ferric ammonium chloride | 0.006 | 42 |

It can be seen from the above examples, I and II, that the addition of iron salts greatly increases the rate of decomposition, while the addition of the oxalate neutralizes the effect of the iron and allows the reaction to proceed as if iron had never been added. A comparison of case 4 in Example I and case 2 in Example II indicates that the rate of decomposition is dependent upon the amount of iron salt added within the aforementioned limit, and a comparison of cases 2 and 3 in Example II indicates that the rate of decomposition is dependent also on the salt used to the extent that the salt which liberates a higher percentage of iron causes a greater increase in the rate of decomposition.

It will be apparent that the embodiments described are only exemplary and that various modifications can be made within the scope of my invention as defined in the appended claims.

I claim:

1. In the bleaching process in which sodium chlorite in an acidic solution is decomposed to produce chlorine dioxide, a method of controlling the rate of bleaching by controlling the rate at which chlorine dioxide is evolved, said method comprising increasing the rate of decomposition by adding a small amount of a water-soluble iron salt to the solution and when the bleaching has proceeded to a predetermined point, decreasing the rate, thus increased, by the addition of a water-soluble nonferrous salt of an organic acid selected from the group consisting of the salts of oxalic acid, tartaric acid and citric acid.

2. In the process in which a material is bleached by the action of chlorine dioxide produced as a result of the decomposition of sodium chlorite in an acidic solution, the method of controlling the rate of bleaching by varying the rate at which the sodium chlorite is decomposed to form chlorine dioxide, which method comprises increasing the rate of decomposition by the addition of an amount of water-soluble iron salt sufficient to produce a maximum concentration of iron ions in the solution of 0.04 percent by weight, and when the bleaching has proceeded to a predetermined point, decreasing the rate of decomposition, thus increased, by the addition of a water-soluble nonferrous salt of an organic acid selected from the group consisting of the salts of oxalic acid, tartaric acid, and citric acid.

References Cited in the file of this patent

UNITED STATES PATENTS

| | | |
|---|---|---|
| Re. 23,218 | Levy | Apr. 11, 1950 |
| 2,022,262 | White | Nov. 26, 1935 |
| 2,073,923 | Crocker | Mar. 16, 1937 |
| 2,086,867 | Hall | July 13, 1937 |
| 2,236,970 | Goldfarb | Apr. 1, 1941 |
| 2,691,637 | Waibel | Oct. 12, 1954 |

FOREIGN PATENTS

| | | |
|---|---|---|
| 640,394 | Great Britain | July 19, 1950 |
| 121,074 | Australia | Feb. 20, 1946 |
| 895,266 | France | Jan. 19, 1945 |
| 470,725 | Canada | Jan. 9, 1951 |

OTHER REFERENCES

Chem. Abstracts, vol. 43, page 3159, bottom half.

Zussman: "Sequestering Agents: Their Use in Textile Processing," Am. Dyest. Rpt., June 27, 1949, pp. P500–504, especially at p. P501, column 3, "Oxidation."

Baier: "Das Bleichen von Pflanzenfasern mit Natriumchlorit," Melliand Textilberichte, Feb. 1951, pp. 141–146, esp. pp. 142–144.

Ridge et al.: "Jute Cellulose," J. Test. Instit., Aug. 1944, pp. T93–T116, esp. at p. T106.